Oct. 8, 1957

P. G. WOLFE

HORIZONTAL MAGNETIC DEFLECTION SYSTEM FOR TELEVISION RECEIVERS

Filed Nov. 17, 1955

2,809,327

INVENTOR.
PAUL G. WOLFE
BY
Dean V. Hazeltine
ATTORNEY

United States Patent Office 2,809,327

Patented Oct. 8, 1957

2,809,327

HORIZONTAL MAGNETIC DEFLECTION SYSTEM FOR TELEVISION RECEIVERS

Paul G. Wolfe, Oreland, Pa., assignor to Philco Corporation, Philadelphia, Pa., a corporation of Pennsylvania Application November 17, 1955, Serial No. 547,467

9 Claims. (Cl. 315—27)

This invention relates to horizontal magnetic deflection systems in television receivers, and more particularly the invention relates to the elimination or minimization of ringing currents in the horizontal deflection coils of the deflection system.

The horizontal magnetic deflection system now commonly employed in television receivers includes an output or driver tube, an output transformer, a magnetic deflection yoke whose horizontal deflection coils are connected to the transformer, and a damper tube operatively associated with the horizontal deflection coils. Usually, the transformer is an autotransformer, and high voltage for the second anode of the cathode ray tube is derived therefrom. A signal of suitable form is supplied to the driver tube which conducts during approximately the whole of the trace interval and is cut off during the retrace interval. Upon cut off of the driver tube, the energy in the yoke is dissipated by transferring the energy by means of the autotransformer to high voltage power.

As is well known, the mode of operation and the oscillatory character of the deflection system cause undesired transient oscillations, giving rise to so-called ringing currents which tend to persist through the trace interval and tend to produce noticeable visual effects in the image. Furthermore, while it is economically advantageous to derive high voltage from the deflection system for application to the second anode of the cathode ray tube, in such a system the ringing currents are more pronounced and more troublesome.

Numerous proposals have been made in the past for the elimination or minimization of these undesired currents and their effects, but none of them has been adequate in practice to provide a wholly satisfactory solution of the problem.

Accordingly, one object of the present invention is to provide a satisfactory solution of this problem.

Another object of the invention is to provide a simple and highly effective arrangement for substantially excluding ringing currents from the horizontal deflection coils.

Still another object of the invention is to provide an arrangement wherein substantial exclusion of the ringing currents from the horizontal deflection coils is accomplished by effectively isolating the source of ringing currents from the deflecting coils.

In prior attempts to solve the problem of ringing currents, the approach generally has been toward the provision of means to dissipate or damp such currents or divert them away from the deflecting coils.

The present invention is based upon a new and different approach to the problem. It was first determined that the ringing currents originate in the transformer, and from this it was reasoned that the proper approach to the problem should be toward effective isolation of the transformer as the source of the ringing currents. An attempt was made to effect the desired isolation by the insertion of impedance in the connection between the transformer and the yoke, but this proved to be unsuccessful. Further experimental work led to the discovery that the ringing voltage goes through a null point on the transformer, and to the further discovery that the null point could be established at the optimum location for maximum power transfer by insertion of suitable impedance in series with the transformer during both conduction and non-conduction of the driver tube. Then, with the deflection yoke connected to the transformer at the null point, the transformer is effectively isolated from the horizontal deflection coils insofar as ringing currents are concerned, and such currents are substantially excluded from the deflection coils.

This invention effectively provides a bridge arrangement which may be balanced, insofar as ringing currents are concerned, to prevent or minimize delivery of such currents to the horizontal deflection coils. Balance of the bridge during both conduction and non-conduction of the driver tube requires different values of impedance in series with the transformer. In the preferred embodiment of the invention, the different values of impedance are provided by utilizing two impedances in parallel relation, and by providing a switching diode in one of the parallel branches so as to effectively insert and remove one of the impedances.

The invention may be fully understood from the following detailed description with reference to the accompanying drawing, wherein.

Figure 1:
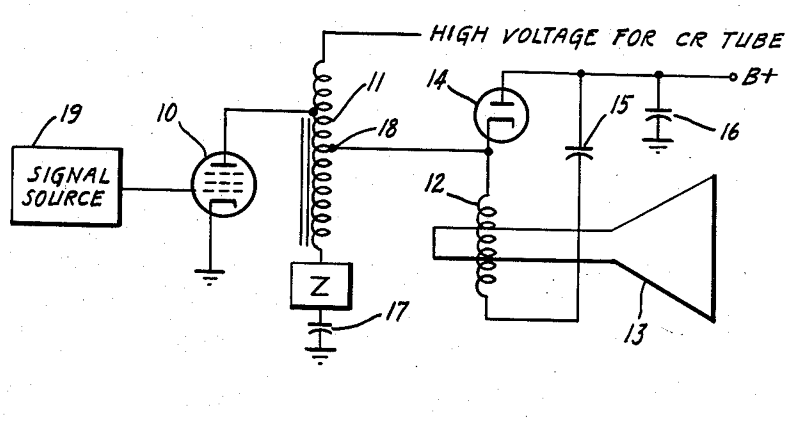
Fig. 1 is a simplified illustration of the pertinent portion of a horizontal deflection system embodying the present invention.

Referring first to Fig. 1 there is shown the pertinent portion of a conventional horizontal deflection system comprising the output or driver tube 10, the output transformer 11 which is preferably an autotransformer as shown, the deflecting yoke which includes the horizontal deflecting coils represented at 12 associated with the cathode ray tube 13, the damper tube 14, the associated capacitors 15 and 16 and the boosting capacitor 17. These elements are connected as shown, the horizontal deflecting coils being connected to the winding of transformer 11 at the optimum point 18 for power transfer to the yoke. High voltage is derived from the transformer and is rectified for application to the second anode of the cathode ray tube. Disregarding for the moment the block labeled Z, all of the other elements shown are conventional and their functions are well understood by those skilled in the art.

It will be understood that the horizontal deflection system of a television receiver also includes other components by which a suitable driving voltage is supplied to the control grid of the output or driver tube. Since the present invention is concerned only with the components shown, there is no need to illustrate or describe other components of the complete system. In Fig. 1, the components which constitute a signal source for tube 10 are represented by the labeled block 19.

As hereinbefore mentioned, during operation of the system ringing current tends to be produced in the horizontal deflecting coils, and the present invention is directed toward the elimination or minimization of such current. This invention, as previously indicated, evolved from the determination that the transformer is a source of transient ringing voltage, and the discovery that there is a point along the transformer, with respect to ground, at which the ringing voltage goes through a null. From this discovery it was deduced that if the yoke were connected to the transformer winding at the null point, there would be no ringing currents delivered to the yoke. However, it was found that this point is not usually the optimum point for maximum power transfer or most efficient operation. After considerable experimentation, it was found that the null point could be made to coincide with the optimum point for power transfer by inserting suitable impedance in series between the transformer and ground. In Fig. 1, this inserted impedance is represented by the block Z.

Figure 2:
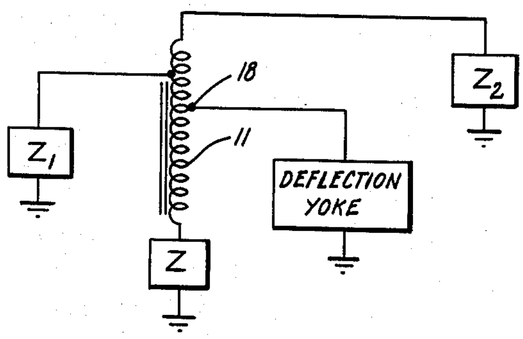
Fig. 2 is an explanatory illustration which will facilitate a clear understanding of the invention.

Reference is now made to Fig. 2 for a simplified illustration and explanation of a system embodying the invention. In this illustration, Z is the impedance inserted in accordance with this invention, $Z_1$ is the plate conductance of the output tube, and $Z_2$ is the stray capacitance of the high voltage section. Assume first that Z is omitted or is effectively removed by being short-circuited. If a current were passed through the transformer and then cut off, a current at the ringing frequency would flow through the deflection yoke. Now it has been found that with Z inserted, for a particular value of resistance and reactance of this impedance, the ringing current in the yoke can be reduced substantially to zero. Experimentation has shown that the arrangement illustrated is a bridge circuit which can be balanced at the optimum point 18 for power transfer, insofar as the ringing current is concerned, by means of a suitable impedance Z. If this balance is achieved and maintained throughout the operating cycle, the transformer is effectively isolated from the horizontal deflecting coils, with respect to the ringing voltage in the transformer, and thus no ringing current is delivered to the deflecting coils.

To achieve balance of the circuit throughout the operating cycle, it is necessary that the impedance Z be proper during both conduction and non-conduction of the output or driver tube. When plate current is flowing in this tube, its plate conductance is constant. At this time, for balance of the circuit it is necessary that Z be a relatively low resistance, e. g., approximately 700 to 800 ohms. When the output or driver tube is not conducting, for balance of the circuit it is necessary that Z be a highly resistive and slightly reactive impedance. It is desirable, therefore, to provide suitable means to effect the required changes in the impedance Z during each operating cycle to maintain a balanced condition of the system.

Figure 3:
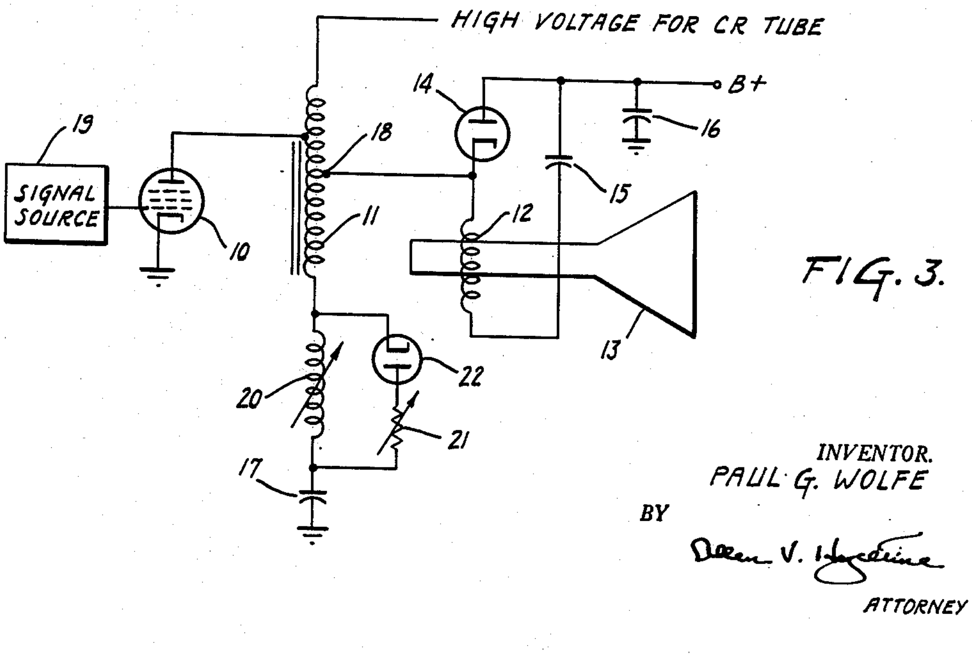
Fig. 3 is a diagrammatic illustration of the pertinent portion of a horizontal deflection system embodying the preferred form of the invention.

Fig. 3 shows a preferred embodiment of the invention, wherein shunt related impedance elements and a switching diode are employed to provide the required impedance in series with the transformer 11 during both conduction and non-conduction of the driver tube 10. In this embodiment, an adjustable inductor 20 provides a highly resistive and slightly reactive impedance, and a shunt resistor 21 provides a relatively low resistance. A diode 22 is included in the shunt in series with resistor 21, and is poled so as to be conductive only when the plate voltage of the driver tube 10 is positive. With this arrangement, when the plate voltage of tube 10 swings negative following retrace due to energy stored in the transformer, the diode 22 goes out of conduction, rendering high impedance 20 effective to maintain a balance of the circuit as above-described. When the plate voltage of tube 10 goes positive, the diode 22 conducts and this effectively inserts the resistance 21 which balances the plate conductance of tube 10 and thus maintains a balance of the circuit.

Thus, during non-conduction of the driver tube 10, the impedance element 20 is effective to achieve the desired balance of the circuit, and during conduction of the driver tube 10, the diode 22 conducts and effectively closes the low impedance circuit branch through resistor 21 to compensate for the conductance of the driver tube.

It should be noted that the diode 22 actually serves two purposes. During retrace, the diode provides a low impedance path between the transformer and ground, and therefore it improves the efficiency of the transformer in supplying high voltage for the cathode ray tube. During the portion of the trace interval when the driver tube 10 is conducting, the diode also conducts to maintain a balance of the circuit.

By way of example only, in one embodiment of the invention in the horizontal deflection circuit of an experimental television receiver, the inductor 20 is adjustable between 5 and 11 mh. and its resistive impedance at ringing frequency is 20,000 to 50,000 ohms. The resistor 21 is adjustable between 500 and 1100 ohms. Capacitors 15, 16 and 17 have values respectively of 20 microfarads, 100 microfarads and 0.5 microfarad.

While a preferred embodiment of the invention has been illustrated and described, it will be understood that the invention is not limited thereto but contemplates such modifications and further embodiments as may occur to those skilled in the art.

I claim:

1. In a horizontal magnetic deflection system for a television receiver wherein an output or driver tube is connected to a transformer, from a winding of which high voltage is derived, and wherein the horizontal deflection coils are connected to an optimum point on said winding for transfer of energy to said coils, the method of preventing or minimizing flow of undesired transient currents in said coils, which comprises introducing impedance in series with said winding effective during non-conduction of said tube to maintain at said point substantially zero value of undesired transient oscillatory voltage produced in said winding as an incident to operation of the system, and introducing impedance in shunt with the first-mentioned impedance during conduction of said tube to compensate for the conductance of said tube and to maintain the aforementioned zero valve at said point.

2. In a horizontal magnetic deflection system for a television receiver having a cathode ray tube, a grid-controlled driver tube to the control grid of which a driving voltage is supplied, an output transformer connected to said driver tube including a winding from which energy for deflection is derived, a deflection yoke for said cathode ray tube having horizontal deflection coils, means connecting said coils to said winding at an optimum point for transfer of energy to the coils, there being an undesired transient oscillatory voltage produced in said winding as an incident to operation of the system, and means for inserting impedance in series with said winding at the low potential end thereof effective to establish and maintain substantially zero value of said oscillatory voltage at said point, thereby effectively to isolate said transformer from said coils with respect to said oscillatory voltage and thus prevent undesired current flow to said coils.

3. In a horizontal magnetic deflection system for a television receiver having a cathode ray tube, a grid-controlled driver tube to the control grid of which a driving voltage is applied, an output transformer connected to said driver tube including a winding from which energy for deflection is derived and from which high voltage for said cathode ray tube is also derived, a deflection yoke for said cathode ray tube having horizontal deflection coils, means connecting said coils to said winding at an optimum point for transfer of energy to the coils, there being an undesired transient oscillatory voltage produced in said winding as an incident to operation of the system, and means for inserting impedance of one value in series with said winding during conduction of said driver tube, and for inserting impedance of a different value in series with said winding during non-conduction of said driver tube, the impedance values being effective to establish and maintain substantially zero value of said oscillatory voltage at said point, thereby effectively to isolate said transformer from said coils with respect to said oscillatory voltage and thus prevent undesired current flow to said coils.

4. In a horizontal magnetic deflection system for a television receiver having a cathode ray tube, a grid-controlled driver tube to the control grid of which a driving voltage is supplied, an output transformer connected to said driver tube including a winding from which energy for deflection is derived and from which high voltage for said cathode ray tube is also derived, a deflection yoke for said cathode ray tube having horizontal deflection coils, means connecting said coils to said winding at an optimum point for transfer of energy to the coils, there being an undesired transient oscillatory voltage produced in said winding as an incident to operation of the system, a high impedance connected to the low potential end of said winding in series therewith, a relatively low impedance in shunt with said high impedance, and means for closing and opening the shunt during conduction and non-conduction respectively of said driver tube, said impedances being effective to maintain substantially zero value of said oscillatory voltage at said point, thereby effectively to isolate said transformer from said coils with respect to said oscillatory voltage and thus prevent undesired current flow to said coils.

5. A system according to claim 4, wherein said high impedance is an inductor, said low impedance is a resistor, and said means for closing and opening the shunt through the latter is a diode.

6. In a horizontal magnetic deflection system for a television receiver having a cathode ray tube, a grid-controlled driver tube to the control grid of which a driving voltage is supplied, an output autotransformer connected to said driver tube for transfer of energy for deflection and also serving to provide high voltage for said cathode ray tube, a boosting capacitor connected to one end of said transformer, a deflection yoke for said cathode ray tube having horizontal deflection coils, means connecting said coils to said transformer at an optimum point for transfer of energy to the coils, there being an undesired transient oscillatory voltage produced in said transformer as an incident to operation of the system, and means for inserting serially between said transformer and said capacitor impedance effective to establish and maintain substantially zero value of said oscillatory voltage at said point, thereby effectively to isolate said transformer from said coils with respect to said oscillatory voltage and thus prevent undesired current flow in said coils.

7. In a horizontal magnetic deflection system for a television receiver having a cathode ray tube, a grid-controlled driver tube to the control grid of which a driving voltage is supplied, an output autotransformer connected to said driver tube for transfer of energy for deflection and also serving to provide high voltage for said cathode ray tube, a boosting capacitor connected to one end of said transformer, a deflection yoke for said cathode ray tube having horizontal deflection coils, means connecting said coils to said transformer at an optimum point for transfer of energy to the coils, there being an undesired transient oscillatory voltage produced in said transformer as an incident to operation of the system, and means for inserting impedance of one value serially between said transformer and said capacitor during conduction of said driver tube, and for inserting impedance of a different value serially between said transformer and said capacitor during non-conduction of said driver tube, the impedance values being effective to establish and maintain substantially zero value of said oscillatory voltage at said point, thereby effectively to isolate said transformer from said coils with respect to said oscillatory voltage and thus prevent undesired current flow in said coils.

8. In a horizontal magnetic deflection system for a television receiver having a cathode ray tube, a grid-controlled driver tube to the control grid of which a driving voltage is supplied, an output autotransformer connected to said driver tube for transfer of energy for deflection and also serving to provide high voltage for said cathode ray tube, a boosting capacitor connected to one end of said transformer, a deflection yoke for said cathode ray tube having horizontal deflection coils, means connecting said coils to said transformer at an optimum point for transfer of energy to the coils, there being an undesired transient oscillatory voltage produced in said transformer as an incident to operation of the system, a high impedance serially connected between said transformer and said capacitor, a relatively low impedance in shunt with said high impedance, and means for closing and opening the shunt during conduction and non-conduction respectively of said driver tube, said impedances being effective to maintain substantially zero value of said oscillatory voltage at said point, thereby effectively to isolate said transformer from said coils with respect to said oscillatory voltage and thus prevent undesired current flow in said coils.

9. A system according to claim 8, wherein said high impedance is an inductor, said low impedance is a resistor, and said means for closing and opening the shunt through the latter is a diode.

References Cited in the file of this patent

UNITED STATES PATENTS

| | | |
|---|---|---|
| 2,555,831 | Tourshou | June 5, 1951 |
| 2,613,334 | Otis et al. | Oct. 7, 1952 |
| 2,686,276 | Anderson | Aug. 10, 1954 |
| 2,742,591 | Procter | Apr. 17, 1956 |
| 2,743,381 | Dietch | Apr. 24, 1956 |